(12) United States Patent
Murakami et al.

(10) Patent No.: US 11,332,161 B2
(45) Date of Patent: May 17, 2022

(54) INFORMATION PROCESSING APPARATUS, INFORMATION PROCESSING METHOD, AND PROGRAM

(71) Applicant: TOYOTA JIDOSHA KABUSHIKI KAISHA, Toyota (JP)

(72) Inventors: Kunihiro Murakami, Okazaki (JP); Katsuhiko Sakakibara, Kariya (JP); Makoto Matsushita, Ichinomiya (JP); Junya Sato, Nagoya (JP); Kiyonori Yoshida, Toyota (JP); Tae Sugimura, Miyoshi (JP); Takashi Hayashi, Aichi-gun (JP); Jun Endo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 177 days.

(21) Appl. No.: 15/929,227

(22) Filed: Feb. 19, 2020

(65) Prior Publication Data

US 2020/0298889 A1 Sep. 24, 2020

(30) Foreign Application Priority Data

Mar. 18, 2019 (JP) .............................. JP2019-050464

(51) Int. Cl.
*B60W 60/00* (2020.01)
*G01C 21/34* (2006.01)
*G06Q 10/08* (2012.01)
*B60W 50/00* (2006.01)

(52) U.S. Cl.
CPC .. *B60W 60/00256* (2020.02); *B60W 60/0021* (2020.02); *G01C 21/3492* (2013.01); *G06Q 10/08355* (2013.01); *B60W 2050/0095* (2013.01)

(58) Field of Classification Search
CPC ....... B60W 60/00256; B60W 60/0021; B60W 2050/0095; G01C 21/3492; G01C 21/34; G06Q 10/08355; G06Q 10/047; G06Q 10/083; G05D 1/0285; G05D 1/0214
See application file for complete search history.

(56) References Cited

U.S. PATENT DOCUMENTS

2019/0147522 A1* 5/2019 Susser ................ G06Q 30/0641
 705/26.8
2021/0217111 A1* 7/2021 Goldberg ................. A21C 9/08

FOREIGN PATENT DOCUMENTS

JP 2004-305109 A 11/2004

* cited by examiner

*Primary Examiner* — Marthe Y Marc-Coleman
(74) *Attorney, Agent, or Firm* — Oblon, McClelland, Maier & Neustadt, L.L.P.

(57) ABSTRACT

A controller of an autonomous traveling vehicle as an information processing apparatus of the disclosure executes acquiring first information relating to a predetermined item and the first information relating to predetermined processing in a processing apparatus mounted on the autonomous traveling vehicle, acquiring second information relating to shipping of the predetermined item, controlling running of the autonomous traveling vehicle based on the second information, and controlling the operation of the processing apparatus based on the first information when the autonomous traveling vehicle is in a running state based on the second information.

9 Claims, 8 Drawing Sheets

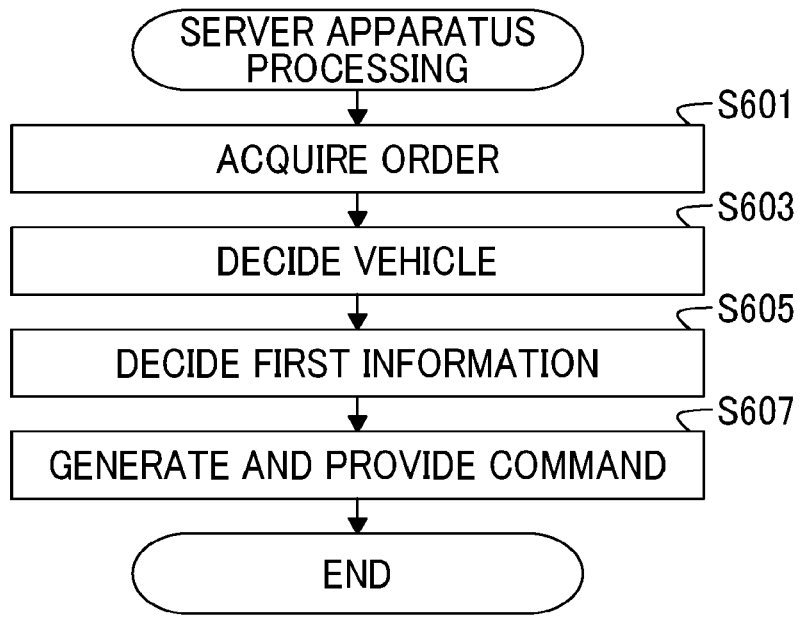
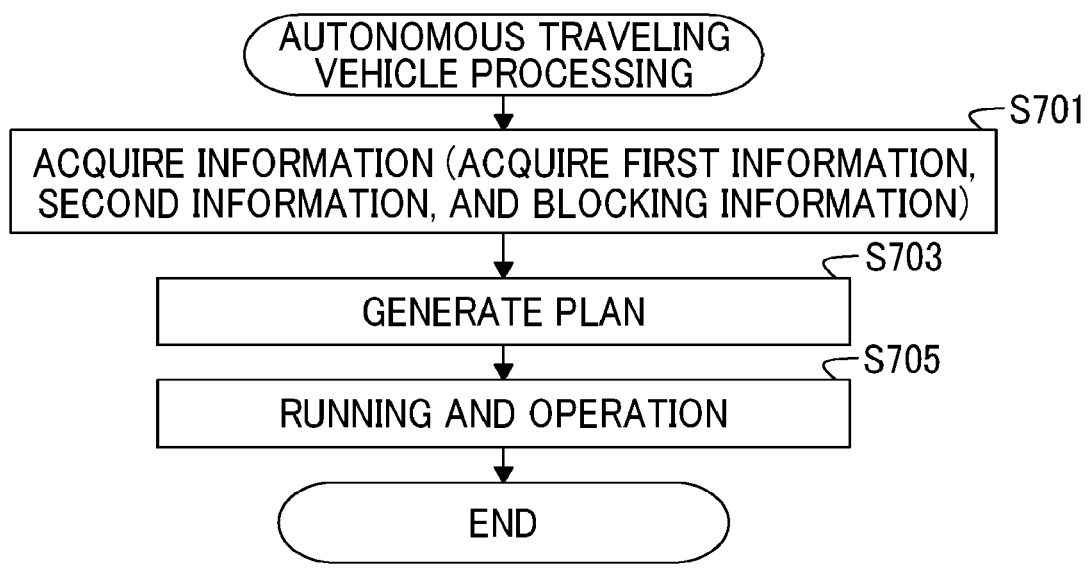

INFORMATION PROCESSING APPARATUS, INFORMATION PROCESSING METHOD, AND PROGRAM

INCORPORATION BY REFERENCE

The disclosure of Japanese Patent Application No. 2019-050464 filed on Mar. 18, 2019 including the specification, drawings and abstract is incorporated herein by reference in its entirety.

BACKGROUND

1. Technical Field

The disclosure relates to an information processing apparatus, an information processing method executed by the information processing apparatus, and a program.

2. Description of Related Art

Japanese Unexamined Patent Application Publication No. 2004-305109 discloses a mobile agricultural product harvesting apparatus that harvests agricultural products, simultaneously sorts the agricultural products by item, and transports the sorted products.

SUMMARY

Incidentally, there is a demand for efficiency relating to shipping of items such as commodities, merchandise, or products in various industries. The disclosure provides an information processing apparatus or an information processing method capable of improving the efficiency of shipping of an item.

A first aspect of the disclosure is exemplified by an information processing apparatus including a controller. The controller executes acquiring first information relating to a predetermined item, the first information relating to predetermined processing in a processing apparatus mounted on a mobile body, acquiring second information relating to shipping of the predetermined item, controlling running of the mobile body based on the second information, and controlling an operation of the processing apparatus based on the first information when the mobile body is in a running state based on the second information. A second aspect of the disclosure is also exemplified by an information processing method executed by at least one computer such as the information processing apparatus. A third aspect of the disclosure is also exemplified by a program causing at least one computer such as the information processing apparatus to perform execution.

With the information processing apparatus, it is possible to improve the efficiency of shipping of the predetermined item.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a flowchart of processing of the server apparatus in the system of FIG. 1;

FIG. 7 is a flowchart of processing of the autonomous traveling vehicle in the system of FIG. 1;

DETAILED DESCRIPTION OF EMBODIMENTS

Hereinafter, an information processing apparatus, an information processing method in the information processing apparatus, and a program according to an embodiment of the disclosure will be described with reference to drawings. First, a first embodiment will be described.

Figure 1:
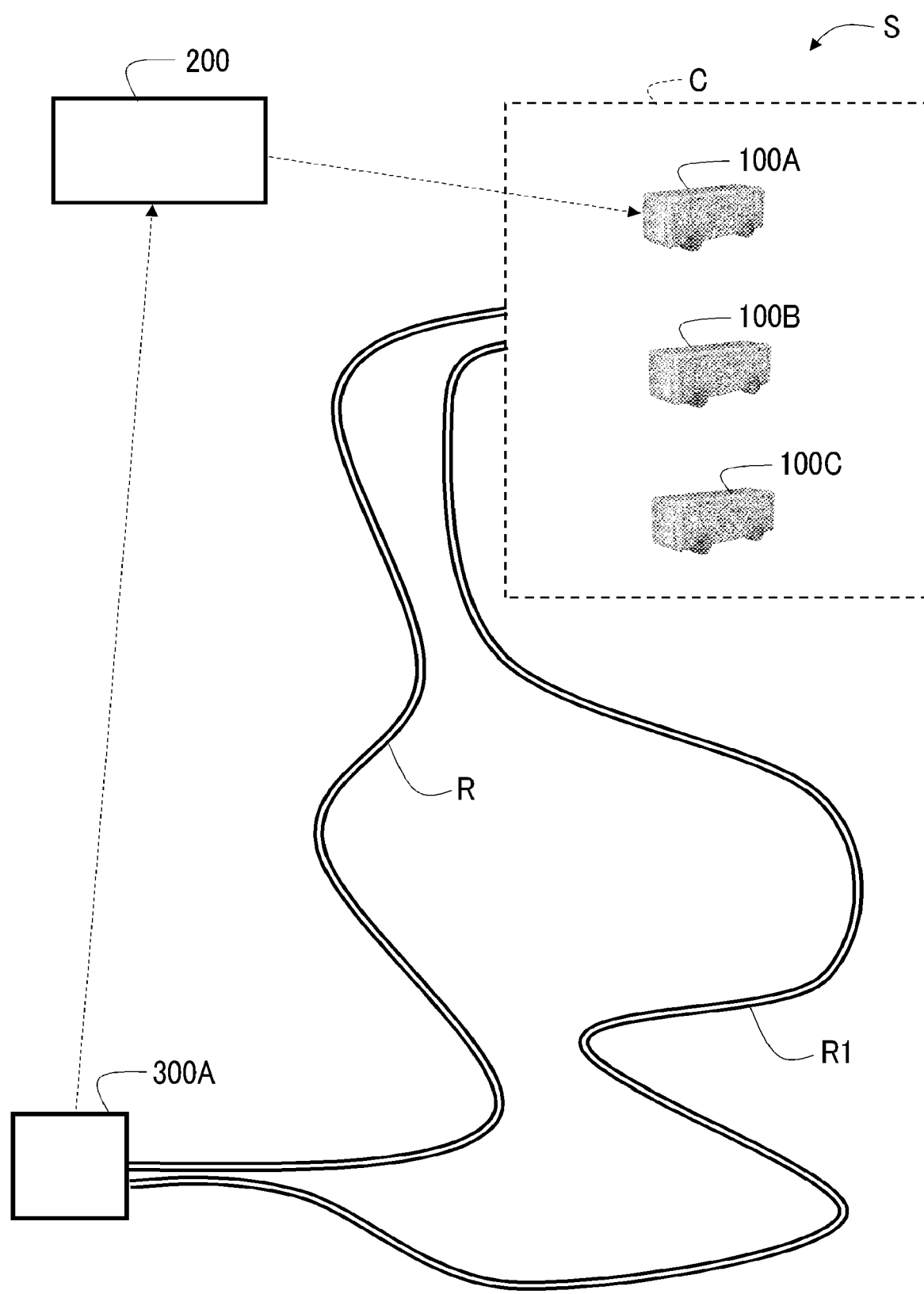
FIG. 1 is a conceptual diagram of an operation of a system according to a first embodiment of the disclosure.

FIG. 1 conceptually shows a shipping system S according to the first embodiment of the disclosure. The shipping system S includes an autonomous traveling vehicle 100 and a server apparatus 200. The autonomous traveling vehicle 100 is an example of a mobile body that ships a predetermined item. The server apparatus 200 is an information processing apparatus and is a computer on a network N. The server apparatus 200 is configured to be able to communicate with each of the autonomous traveling vehicles 100 through the network N and cooperates with the information processing apparatus of the autonomous traveling vehicle 100 through the network N. In FIG. 1, three autonomous traveling vehicles 100A, 100B, 100C are exemplified among a plurality of autonomous traveling vehicles 100, but the number of autonomous traveling vehicles 100 is not limited thereto.

A state where the autonomous traveling vehicles 100 (100A, 100B, 100C) are waiting at a center C that sells and manages food products such as agricultural products and fishery products is represented in FIG. 1. The center C is, for example, a market or a food processing factory, but may be a fishing port that handles fishery products, a farm that handles agricultural products, a factory that manufactures industrial products (including processed products other than food products such as precious metals and accessories), or the like. It is possible for each of the autonomous traveling vehicles 100 to load a raw material or the like which is the predetermined item, travel along a route (not shown) or routes R, R1 shown in FIG. 1, and ship the predetermined item to a shipping destination on a user apparatus 300 side. Here, the server apparatus 200 is provided outside the center C. The server apparatus 200 may be provided in the center C, but is provided outside the center C herein. The server apparatus 200 can communicate with another server apparatus and the like through the network N. The user apparatuses 300 (300A and so on) are configured to be communicable with the server apparatus 200 through the network N.

In FIG. 1, solely a user apparatus 300A among a plurality of user apparatuses 300 is exemplified, but the number of user apparatuses is not limited thereto and may be any number.

The autonomous traveling vehicle 100 is also referred to as an electric vehicle (EV) pallet. The autonomous traveling vehicle 100 is a mobile body capable of performing autonomous driving and unmanned driving, and there are various sizes. For example, the autonomous traveling vehicle 100 of various sizes can be used, from a small vehicle for shipping a small predetermined item such as an accessory to a large vehicle capable of shipping a predetermined item requiring a large processing apparatus. Each autonomous traveling vehicle 100 is a vehicle that ships the predetermined item. In particular, in the embodiment, the autonomous traveling vehicle 100 is a vehicle that can process a raw material for producing a predetermined item in addition to the transportation and is equipped with a processing apparatus for performing various types of processing. Examples of the processing apparatus include a cleaning apparatus, process apparatuses such as a food process apparatus and an industrial product process apparatus, and a packaging apparatus.

The autonomous traveling vehicle 100 has a control function for controlling itself and a communication function. The autonomous traveling vehicle 100 can provide a user with a function and a service added by the server apparatus on the network in addition to processing that can be executed by the autonomous traveling vehicle 100 alone, in cooperation with the server apparatus on the network. The autonomous traveling vehicle 100 does not necessarily need to be an unmanned vehicle. For example, a sales staff, a customer service staff, a security staff, or the like may be on board the vehicle. The autonomous traveling vehicle 100 may not necessarily be a vehicle capable of performing complete autonomous traveling. For example, the vehicle may be a vehicle in which a person drives or assists driving depending on a situation. In the embodiment, the autonomous traveling vehicle 100 runs, that is, travels based on a predetermined running command and also executes processing of a raw material or the like for shipping of a predetermined item while the vehicle travels.

The autonomous traveling vehicle 100 is configured to be communicable with the user apparatuses 300 (300A and so on) through the network N. The user apparatus 300 can receive an input from the user and an operation equivalent to the input, and can transmit the received input and operation to the autonomous traveling vehicle 100 in addition to the server apparatus 200 through the network N. The user apparatus 300 may directly transmit and receive to and from the autonomous traveling vehicle 100.

The server apparatus 200 commands the running to the autonomous traveling vehicle 100. For example, the server apparatus 200 transmits a running command about what kind of item, that is, predetermined item, where, when for delivery, that is, shipping to the autonomous traveling vehicle 100.

Figure 2:
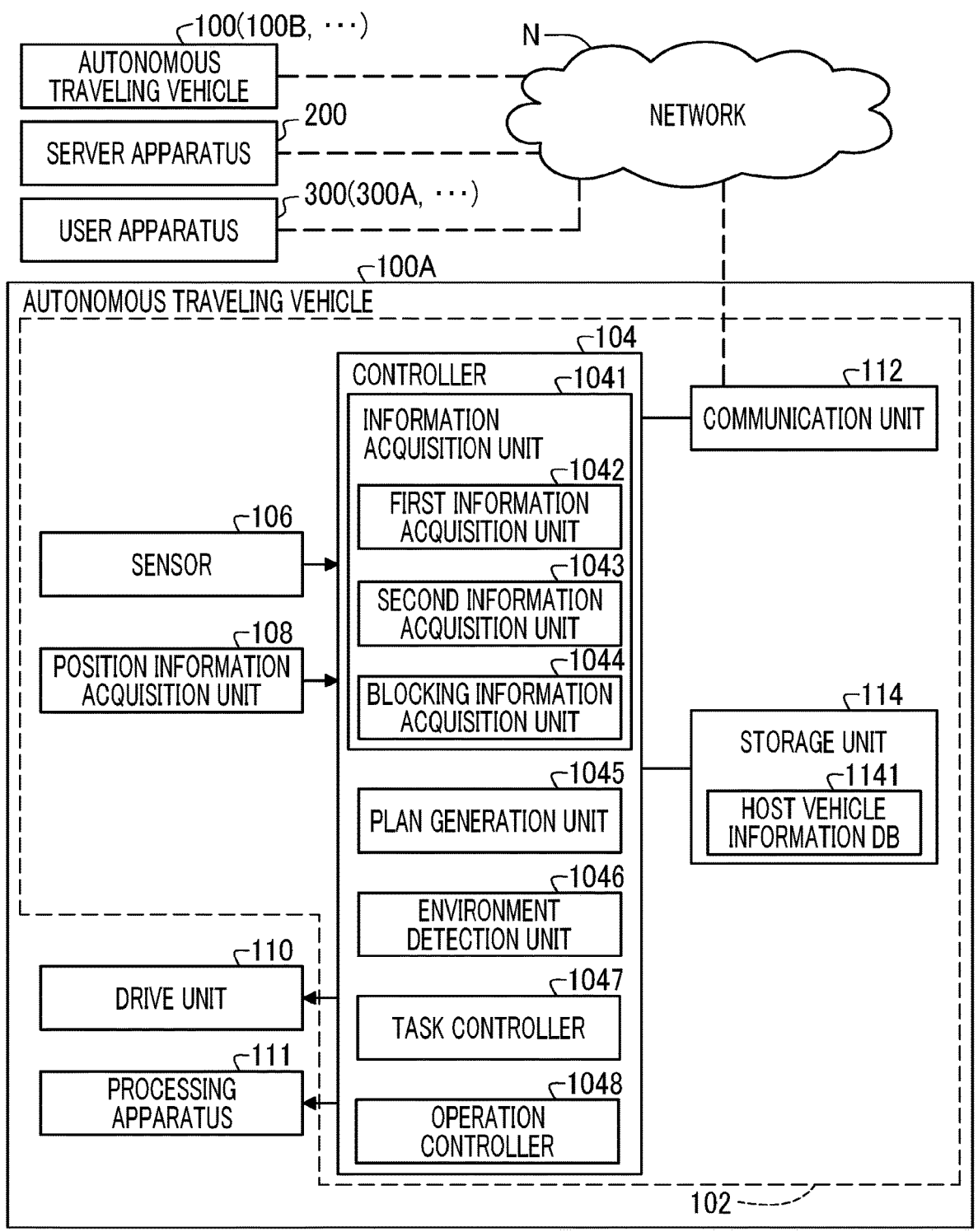
FIG. 2 is a block diagram schematically showing a configuration of the system in FIG. 1 and is a diagram particularly showing a configuration of an autonomous traveling vehicle.

Hereinafter, each component in the shipping system S in FIG. 1 will be described in detail below. FIG. 2 is a block diagram schematically showing a configuration of the shipping system S including the autonomous traveling vehicle 100, the server apparatus 200, and the user apparatus 300 shown in FIG. 1, and is a diagram particularly showing a configuration of the autonomous traveling vehicle 100. In FIG. 2, a configuration of the autonomous traveling vehicle 100A is shown as an example of the autonomous traveling vehicle 100. Other autonomous traveling vehicles 100B, 100C and the like have the same configuration as autonomous traveling vehicle 100A.

An autonomous traveling vehicle 100A in FIG. 2 includes an information processing apparatus 102 and includes a controller 104 that substantially performs a function of the apparatus. The autonomous traveling vehicle 100A can travel or the like according to the running command acquired from the server apparatus 200. Specifically, the autonomous traveling vehicle 100A generates a traveling route based on a running command acquired through the network N and travels by an appropriate method while sensing a periphery of a vehicle. While the autonomous traveling vehicle 100A travels, the vehicle executes processing relating to a predetermined item related to the shipping based on the running command.

The autonomous traveling vehicle 100A further includes a sensor 106, a position information acquisition unit 108, a drive unit 110, a processing apparatus 111, a communication unit 112, and a storage unit 114. The autonomous traveling vehicle 100A operates with electric power supplied from a battery.

The sensor 106 is means for sensing the vehicle periphery and typically includes a stereo camera, a laser scanner, light detection and ranging, laser imaging detection and ranging (LIDAR), a radar, and the like. Information acquired by the sensor 106 is transmitted to the controller 104. The sensor 106 includes a sensor for allowing a host vehicle to perform autonomous traveling. The sensor 106 may include a camera provided on a vehicle body of the autonomous traveling vehicle 100A. For example, the sensor 106 may include an imaging apparatus using an image sensor such as a charge-coupled device (CCD), metal-oxide-semiconductor (MOS), or complementary metal-oxide-semiconductor (CMOS). A plurality of cameras may be provided at a plurality of locations on the vehicle body. For example, the cameras may be respectively installed on the front, rear, and right and left sides of the vehicle body.

The position information acquisition unit 108 is means for acquiring a current position of the vehicle and typically includes a global positioning system (GPS) receiver and the like. Information acquired by the position information acquisition unit 108 is transmitted to the controller 104. The GPS receiver as a satellite signal receiver receives signals from a plurality of GPS satellites. Each GPS satellite is an artificial satellite that orbits around the earth. A satellite positioning system, that is, navigation satellite system (NSS) is not limited to GPS. Position information may be detected based on the signals from various satellite positioning systems. The NSS is not limited to a global navigation satellite system, but may include a quasi-zenith satellite system, for example, "Galileo" in Europe or "Michibiki" in Japan that is operated integrally with GPS.

The controller 104 is a computer that controls the autonomous traveling vehicle 100A based on information acquired from the sensor 106, the position information acquisition unit 108, and the like. The controller 104 is an example of control means for receiving the running command from the server apparatus 200 to control the traveling of the autonomous traveling vehicle 100A which is a mobile body and the operation of the processing apparatus 111 mounted on the vehicle.

The controller 104 includes a CPU and a main storage unit, and executes information processing by a program. The CPU is also referred to as a processor. The main storage unit of the controller 104 is an example of a main storage apparatus. The CPU in the controller 104 executes a computer program that is developed in the main storage unit in an executable manner to provide various types of functions. The main storage unit in the controller 104 stores the computer program executed by the CPU, data, or the like. The main storage unit in the controller 104 is a dynamic random access memory (DRAM), a static random access memory (SRAM), a read only memory (ROM), or the like.

The controller 104 is connected to the storage unit 114. The storage unit 114 is a so-called external storage unit, is used as a storage region that assists the main storage unit of the controller 104, and stores the computer program executed by the CPU of the controller 104, data, or the like. The storage unit 114 is a hard disk drive, a solid state drive (SSD), or the like.

The controller 104 includes an information acquisition unit 1041, a plan generation unit 1045, an environment detection unit 1046, a task controller 1047, and an operation controller 1048 as functional modules. The information acquisition unit 1041 includes functional modules of a first information acquisition unit 1042, a second information acquisition unit 1043, and a blocking information acquisition unit 1044. Each functional module is realized by causing the controller 104, that is, the CPU thereof to execute a program stored in the main storage unit or the storage unit 114.

The information acquisition unit 1041 acquires information as the running command from the server apparatus 200. Specifically, the information acquisition unit 1041 acquires the running command to acquire information including shipping item processing information, shipping destination information, and delivery date and time information. The shipping item processing information includes information about what the item related to the shipping, that is, the predetermined item is. In the embodiment, the shipping item processing information includes information relating to predetermined processing in the processing apparatus 111 relating to the predetermined item. In the embodiment, the shipping item processing information includes the number of predetermined items, that is, the number of predetermined items ordered. This shipping item processing information corresponds to first information relating to the predetermined item and is acquired by the first information acquisition unit 1042. The shipping destination information includes information about where the shipping destination (delivery destination) of the predetermined item is. The shipping destination information may include at least one of an address, a company name, a telephone number, a latitude, a longitude, and the like. The delivery date and time information includes information about when the delivery date and time of the predetermined item to the shipping destination is. The shipping destination information and the delivery date and time information correspond to second information relating to the shipping of the predetermined item and are acquired by the second information acquisition unit 1043. The information as the running command may include blocking information. This blocking information is information for blocking a balance adjustment of a running time of the autonomous traveling vehicle 100A with respect to an operation time of the processing apparatus 111. The blocking information acquisition unit 1044 can acquire the blocking information. The information acquisition unit 1041 acquires information on the host vehicle periodically or non-periodically, for example, acquires information on an amount, that is, an inventory amount of the raw material to be loaded or information on a processing apparatus 111 to be mounted, and stores the acquired information in an host vehicle information database 1141 of the storage unit 114.

The plan generation unit 1045 generates a running plan of the host vehicle based on the information as the running command acquired from the server apparatus 200, particularly based on the shipping destination information and the delivery date and time information acquired by the second information acquisition unit 1043. In the embodiment, the running plan is data defining a route on which the autonomous traveling vehicle 100A travels and processing requested to be performed by the autonomous traveling vehicle 100A in a part or all of the route. The plan generation unit 1045 generates an operation plan for the processing apparatus 111 based on the shipping item processing information acquired by the first information acquisition unit 1042. Examples of data included in the running plan include the followings.

(1) Data Representing a Route to be Traveled by the Host Vehicle by a Set of Road Links The route to be traveled by the host vehicle may be automatically generated based on a provided departure place and destination (for example, shipping destination) by referring to, for example, map data stored in the storage unit 114. Data on which the vehicle basically travels on the route R may be generated in the case shown in FIG. 1. This is because a program is constructed such that a route to arrive at the destination earlier is selected here, and the route may be selected according to another condition. The route may be generated using an external service.

(2) Data Representing Processing Requested to be Performed by the Host Vehicle at a Point on a Route Examples of the processing requested to be performed by the host vehicle on the route include "loading raw material which is predetermined item", "handing predetermined item", and "receiving receipt or deposit receipt", but are not limited to these. The running plan generated by the plan generation unit 1045 is transmitted to the task controller 1047 described below.

The environment detection unit 1046 detects an environment around the vehicle based on data acquired by the sensor 106. Examples of detection target include the number or positions of lanes, the number or positions of vehicles existing around the host vehicle, and the number or positions of obstacles (for example, pedestrians, bicycles, structures, or buildings) existing around the host vehicle, a road structure, and a road sign, but are not limited to these. Any detection target may be used as long as the target is needed to perform autonomous traveling. The environment detection unit 1046 may track a detected object. For example, a relative speed of the object may be obtained from a difference between coordinates of the object detected one step before and current coordinates of the object. Data relating to the environment (hereinafter referred to as environment data) detected by the environment detection unit 1046 is transmitted to a task controller 1047 described below.

The task controller 1047 controls the running, that is, the traveling of the host vehicle which is the mobile body based on the running plan generated by the plan generation unit 1045, the environmental data generated by the environment detection unit 1046, and the position information of the host vehicle acquired by the position information acquisition unit 108. For example, the host vehicle is caused to travel along a predetermined route and such that an obstacle does not enter a predetermined safety region with the host vehicle as the center. A known method may be employed as a method for causing the vehicle to perform the autonomous traveling. The control of the traveling of the autonomous traveling vehicle 100A is executed based on the shipping destination information and the delivery date and time information, that is, the second information of the predetermined item. The task controller 1047 also executes a task other than the traveling based on the running plan generated by the plan generation unit 1045. Examples of the task include delivery of merchandise to the user and issuance of a receipt and a deposit receipt.

The operation controller 1048 controls the operation of the processing apparatus 111 according to a predetermined program based on the information as the running command acquired from the server apparatus 200, particularly the shipping item processing information acquired by the first information acquisition unit 1042. The operation controller 1048 controls the operation of the processing apparatus 111 according to the operation plan of the processing apparatus 111 generated by the plan generation unit 1045, for example, such that the operation of the processing apparatus 111 is started at an operation start timing of the operation plan. The predetermined item is a cake in the embodiment. The processing apparatus 111 is a cake manufacturing apparatus in the embodiment. The shipping item processing information is information relating to the predetermined item and includes information relating to the predetermined processing, specifically, manufacturing information. The shipping item processing information includes an instruction to inspect a shipping item. When the shipping item is an agricultural product or a fishery product, the shipping item processing information includes instructions to clean, enclose in a package, pack, and the like the shipping item.

The drive unit 110 is means for causing the autonomous traveling vehicle 100A to travel based on the command generated by the task controller 1047. The drive unit 110 includes, for example, a motor, an inverter, a brake, a steering mechanism, a secondary battery, and the like for driving wheels.

Figure 3:
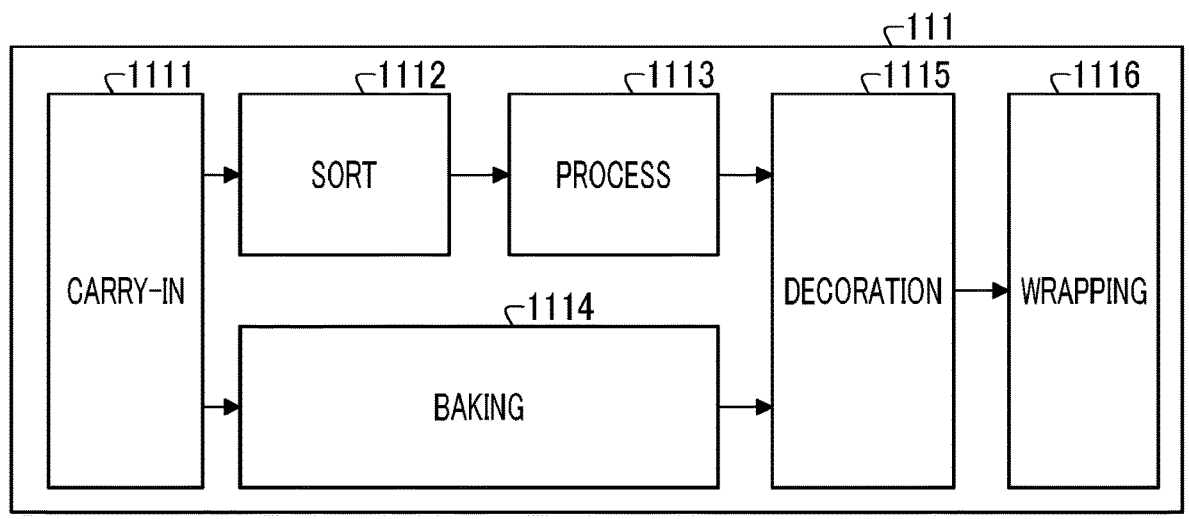
FIG. 3 is a block diagram showing a configuration example of a processing apparatus of the autonomous traveling vehicle in FIG. 2.

The processing apparatus 111 is an apparatus that performs processing relating to the predetermined item. In the embodiment, the processing apparatus 111 is the cake manufacturing apparatus as described above. As shown in FIG. 3, the processing apparatus 111 includes a carry-in apparatus 1111 that carries raw materials and the like into the autonomous traveling vehicle 100A, and a sorting apparatus 1112 that sorts a cake topping which is the predetermined item from the raw materials based on the predetermined item processing information, a process apparatus 1113 that processes the sorted raw material or the like, a baking apparatus 1114 that bakes a sponge of the cake based on the predetermined item processing information, a decoration apparatus 1115 that tops the baked sponge with the processed raw material, and a wrapping apparatus (or packaging apparatus) 1116 that wraps the finished cake. For example, when the predetermined item is a cake using strawberries, the carry-in apparatus 1111 as means for loading goods carries, for example, strawberries, sponge raw materials, and the like as the raw materials. The sorting apparatus 1112 sorts strawberries that have a size suitable for the cake from the carried strawberries. The process apparatus 1113 cuts or crushes the sorted strawberries. The baking apparatus 1114 performs baking while processing the sponge raw materials as necessary. The decoration apparatus 1115 tops the sponge with the strawberries and the like to finish the cake. The wrapping apparatus 1116 puts the finished cake in a box or wraps the cake. As described above, the processing apparatus 111 executes the predetermined processing of a part or all of steps before shipping of a predetermined item generally performed in a factory or the like. The processing apparatus 111 may include the cleaning apparatus or a drying apparatus when the predetermined item is an agricultural product or a fishery product, include a heating apparatus or the like when the predetermined item is a processed agricultural product or a processed fishery product, and include a soldering apparatus, a mechanical process apparatus, an inspection apparatus, or the like when the predetermined item is an industrial product. The operation of the processing apparatus 111 is controlled based on the predetermined item information, that is, the first information.

The communication unit 112 includes communication means for connecting the autonomous traveling vehicle 100A to the network N. In the embodiment, the autonomous traveling vehicle 100A can communicate with another device such as the server apparatus 200 or the user apparatus 300 through the network N. The communication unit 112 may further have communication means for performing inter-vehicle communication with other autonomous traveling vehicles 100 (100B and so on) by the autonomous traveling vehicle 100A which is the host vehicle.

Next, the server apparatus 200 will be described. The server apparatus 200 acquires order information of a predetermined item from the user apparatus 300, and generates and transmits a running command to the autonomous traveling vehicle 100 based on the order information. The server apparatus 200 is a device that selects and decides a vehicle suitable for the order information from the autonomous traveling vehicles 100.

Figure 4:
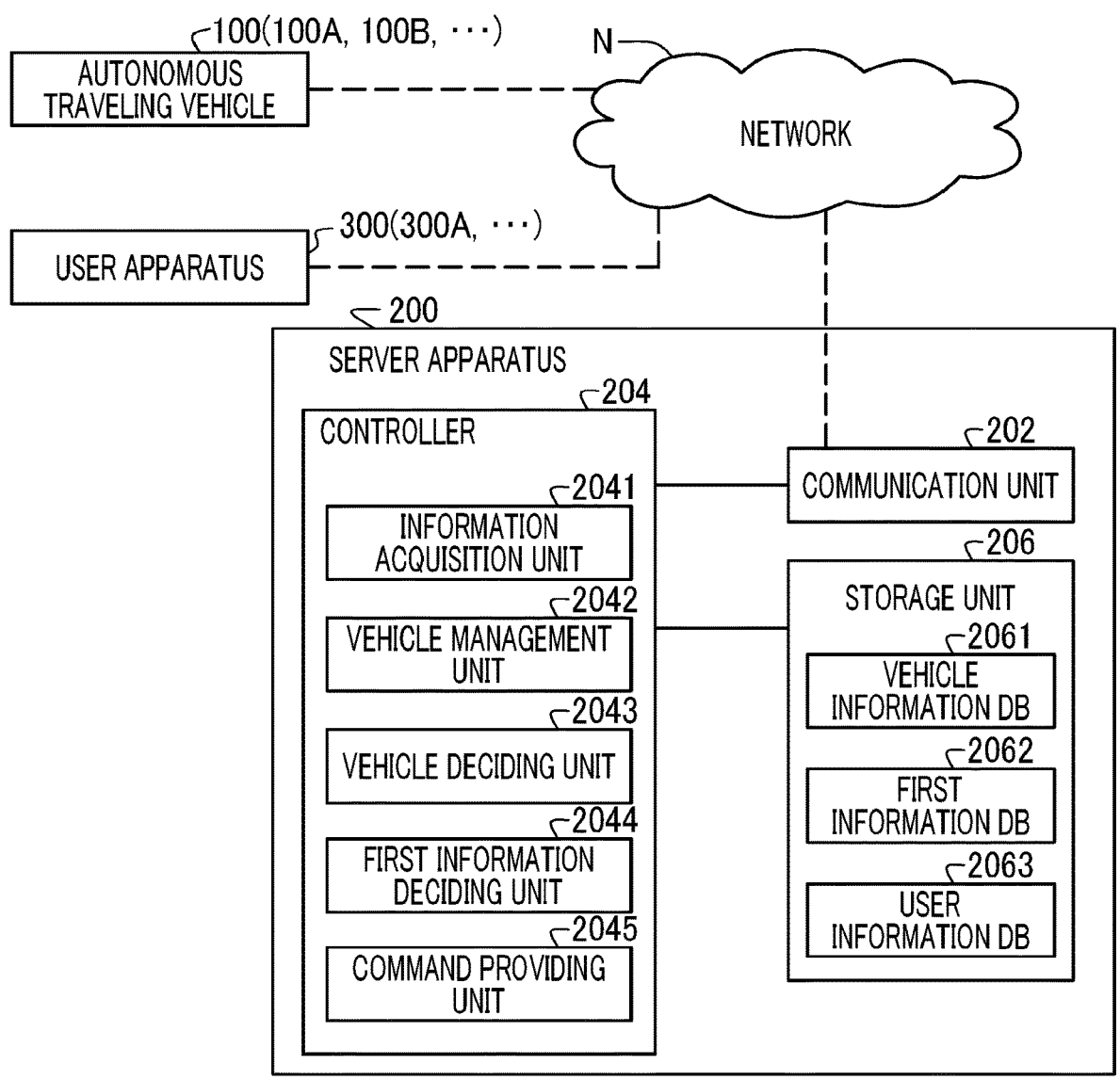
FIG. 4 is a block diagram schematically showing the configuration of the system in FIG. 1 and is a diagram particularly showing a configuration of a server apparatus.

The server apparatus 200 is an information processing apparatus and includes a communication unit 202, a controller 204, and a storage unit 206 as shown in FIG. 4. The communication unit 202 is the same as the communication unit 112 and has a communication function for connecting the server apparatus 200 to the network N. The communication unit 202 of the server apparatus 200 is a communication interface for communicating with the autonomous traveling vehicle 100 and the user apparatus 300 through the network N. The controller 204 includes a CPU and a main storage unit similar to the controller 104 and executes information processing by a program. Of course, the CPU is also a processor, and the main storage unit of the controller 204 is also an example of the main storage apparatus. The CPU in the controller 204 executes a computer program that is developed in the main storage unit in an executable manner to provide various types of functions. The main storage unit in the controller 204 stores the computer program executed by the CPU, data, or the like. The main storage unit in the controller 204 is a DRAM, an SRAM, a ROM, or the like.

The controller 204 is connected to the storage unit 206. The storage unit 206 is an external storage unit, is used as a storage region that assists the main storage unit of the controller 204, and stores the computer program executed by the CPU of the controller 204, data, or the like. The storage unit 206 is a hard disk drive, an SSD, or the like.

The controller 204 is means for controlling the server apparatus 200. As illustrated in FIG. 4, the controller 204 includes an information acquisition unit 2041, a vehicle management unit 2042, a vehicle deciding unit 2043, a first information deciding unit 2044, and a command providing unit 2045 as functional modules. Each of these functional modules is realized by causing the CPU of the controller 204 to execute a program stored in the main storage unit or the storage unit 206.

The information acquisition unit 2041 acquires various types of information from the autonomous traveling vehicle 100 or the user apparatus 300, for example, the order information from the user apparatus 300. The acquired information is transmitted to the vehicle deciding unit 2043, the first information deciding unit 2044, and the command providing unit 2045. The information acquisition unit 2041 periodically acquires position information from the autonomous traveling vehicle 100, information of the host vehicle information database 1141, or the like and transmits the acquired information to the vehicle management unit 2042.

The vehicle management unit 2042 manages information on the autonomous traveling vehicles 100 under management. Specifically, the vehicle management unit 2042 receives information such as data relating to the autonomous traveling vehicles 100 from the autonomous traveling vehicles 100 through the information acquisition unit 2041 and stores the received information in the vehicle information database 2061 of the storage unit 206, for each predetermined period. Position information and vehicle information are used as the information relating to the autonomous traveling vehicle 100. Examples of the vehicle information include an identifier of the autonomous traveling vehicle 100, usage and type thereof, information on a standby point (garage or sales office), a door type, a vehicle body size, a cargo room size, a loading capacity, a travelable distance at full charge, a travelable distance at current time, and a current status, but may be information other than the examples. The current status includes information in the host vehicle information database 1141 such as a type of processing apparatus and an amount, that is, an inventory amount or a type of loaded raw material or the like.

The vehicle deciding unit 2043 decides a vehicle according to the predetermined item based on the order information acquired by the information acquisition unit 2041. A vehicle suitable for the shipping of the predetermined item and suitable for a position of a user of the user apparatus 300, that is, an orderer and a delivery date and time is decided based on the information on the predetermined item in the order information. When the vehicle is decided, the vehicle deciding unit 2043 searches for the vehicle information database 2061.

The first information deciding unit 2044 decides and reads the first information corresponding to the predetermined item based on the order information acquired by the information acquisition unit 2041 in the first information database 2062 stored in the storage unit 206. The first information database 2062 stores and organizes a predetermined item, specifically, a specific item of any one of the agricultural product, the fishery product, the processed agricultural product, the processed fishery product, and the industrial product, and data, a program, or the like of the predetermined processing in the processing apparatus 111 corresponding to the predetermined item. The data or the like of the predetermined processing may be constructed by the server apparatus 200, input from the outside, or acquired from the outside through the network N.

The command providing unit 2045 creates a running command including predetermined item processing information, shipping destination information, and delivery date and time information based on the order information according to a predetermined program, and provides, that is, transmits the running command to the vehicle decided by the vehicle deciding unit 2043. The predetermined item processing information includes the first information decided by the first information deciding unit 2044. When the order information provided from the user apparatus 300 includes a user ID that specifies the user, the command providing unit 2045 can specify user information corresponding to the user ID with reference to the user information database 2063 in the storage unit 206. The specified user information is included in the running command as the shipping destination information. When the order information provided from the user apparatus includes the blocking information, the blocking information is included in the running command.

Next, the user apparatus 300 will be described. Examples of the user apparatus 300 include a portable terminal, a smartphone, and a personal computer. The user apparatus 300A in FIG. 5 includes a communication unit 302, a controller 304, and a storage unit 306 as an example. The communication unit 302 and the storage unit 306 of the user apparatus 300A are the same as the communication unit 202 and the storage unit 206 of the server apparatus 200, respectively. The user apparatus 300A further includes a display unit 308 and an operation unit 310. Examples of the display unit 308 include a liquid crystal display and an electroluminescence panel. Examples of the operation unit 310 may be a keyboard and a pointing device. More specifically, the operation unit 310 includes a touch panel and is substantially integrated with display unit 308 in the embodiment.

The controller 304 includes a CPU and a main storage unit similar to the controller 204 of the server apparatus 200. The CPU of the controller 304 executes an application program (hereinafter application) 3061 stored in the storage unit 306. The application 3061 is an application program for accessing merchandise sales information distributed from a web browser or the server apparatus 200, for example. The application 3061 has a GUI, receives an input, for example, access by the user, and transmits the input to the server apparatus 200 through the network N. The user can input the order information and transmit the information to the server apparatus 200 through the user apparatus 300. For example, the order information may include information on a desired item as a predetermined item, the desired number of items, a desired time, and further a desired place.

Figure 5:
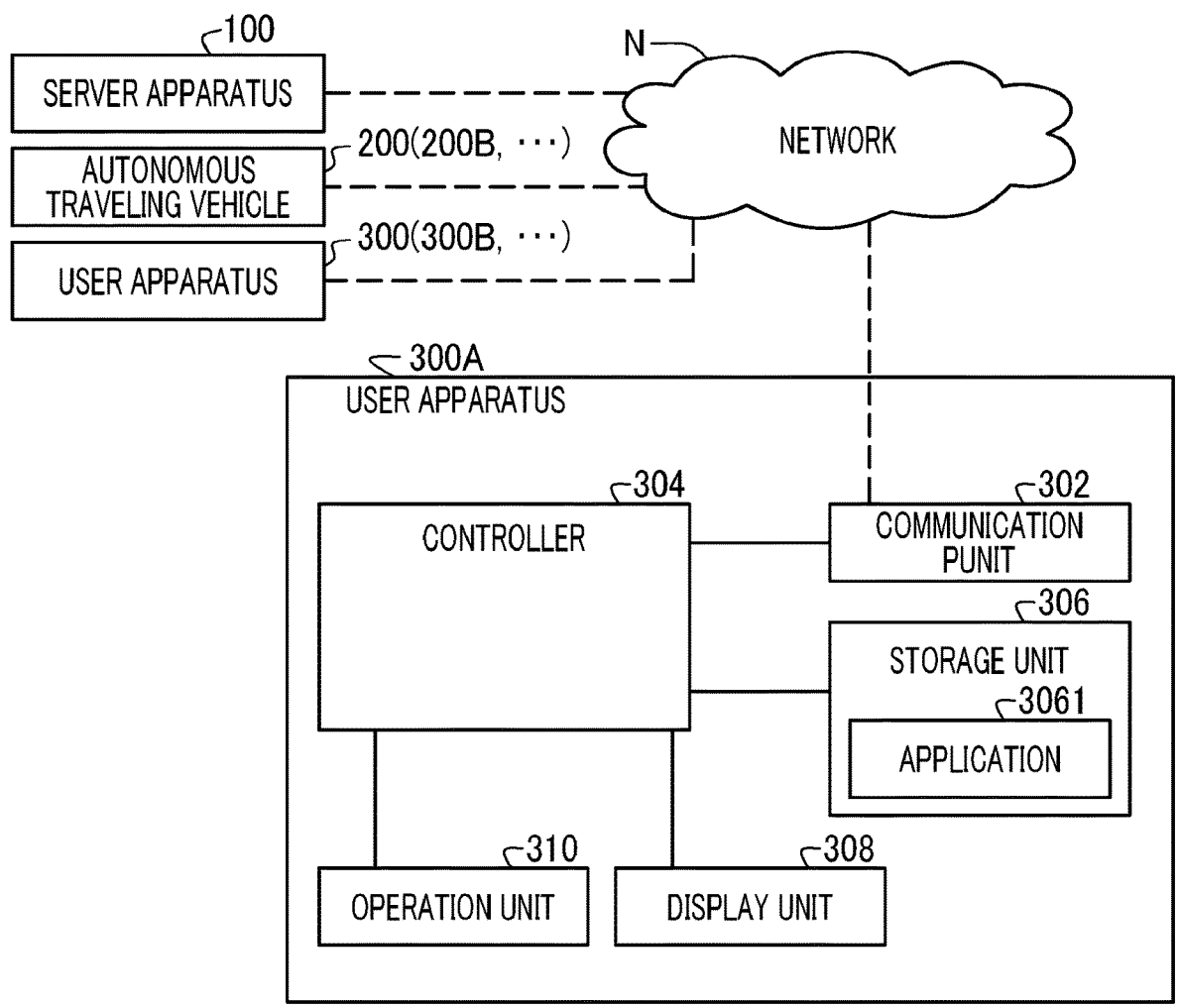
FIG. 5 is a block diagram schematically showing the configuration of the system in FIG. 1 and is a diagram particularly showing a configuration of a user apparatus.

In FIGS. 2, 4, and 5, the autonomous traveling vehicle 100, the server apparatus 200, and the user apparatus 300 are connected by the same network N. However, this connection may be realized by a plurality of networks. For example, a network that connects the autonomous traveling vehicle 100 and the server apparatus 200 may be different from a network that connects the server apparatus 200 and the user apparatus 300.

Processing in the shipping system S having the above configuration will be described based on flowcharts in FIGS. 6 to 8. First, the processing from order reception in the server apparatus 200 to running command provision will be described based on the flowchart of FIG. 6. In the following processing, processing of the autonomous traveling vehicle 100 will be described using the autonomous traveling vehicle 100A as an example. However, the same processing is executed for the other autonomous traveling vehicles 100B, 100C.

The server apparatus 200, that is, the information acquisition unit 2041 of the controller 204 acquires order information from the user apparatus 300 (step S601). FIG. 1 illustrates only the user apparatus 300A that transmits the order information to the server apparatus 200 among the user apparatuses 300.

The server apparatus 200, that is, the vehicle deciding unit 2043 of controller 204 decides a vehicle as described above based on the acquired order information (step S603). The server apparatus 200, that is, the first information deciding unit 2044 of the controller 204 decides first information as described above based on the acquired order information (step S605). The server apparatus 200, that is, the command providing unit 2045 of the controller 204 generates a running command described above based on the order information and the first information decided in step S605 and provides the running command to the vehicle, that is, autonomous traveling vehicle 100A decided in step S603 (step S607).

Next, the running of the autonomous traveling vehicle 100A to which the running command is transmitted from the server apparatus 200 and an execution flow of the predetermined processing in the processing apparatus 111 mounted on the vehicle will be described based on the flowchart of FIG. 7.

The autonomous traveling vehicle 100A, that is, the information acquisition unit 1041 of controller 104 acquires information as the running command from server apparatus 200 (step S701). More specifically, the first information acquisition unit 1042 of the information acquisition unit 1041 acquires shipping item processing information, that is, first information relating to a predetermined item. The second information acquisition unit 1043 of the information acquisition unit 1041 acquires second information relating to shipping of a predetermined item including shipping destination information and delivery date and time information. The blocking information acquisition unit 1044 acquires blocking information.

The autonomous traveling vehicle 100A, that is, the plan generation unit 1045 of the controller 104 generates a running plan as described above (step S703). The control of the running, that is, the traveling of the autonomous traveling vehicle 100A, in other words, the control to the drive unit 110 is executed by the task controller 1047 of the controller 104 based on the running plan (step S705). When the autonomous traveling vehicle 100A is in a running state, that is, in a traveling state, the operation controller 1048 of the controller 104 controls the operation of the processing apparatus 111 (step S705).

Figure 8:
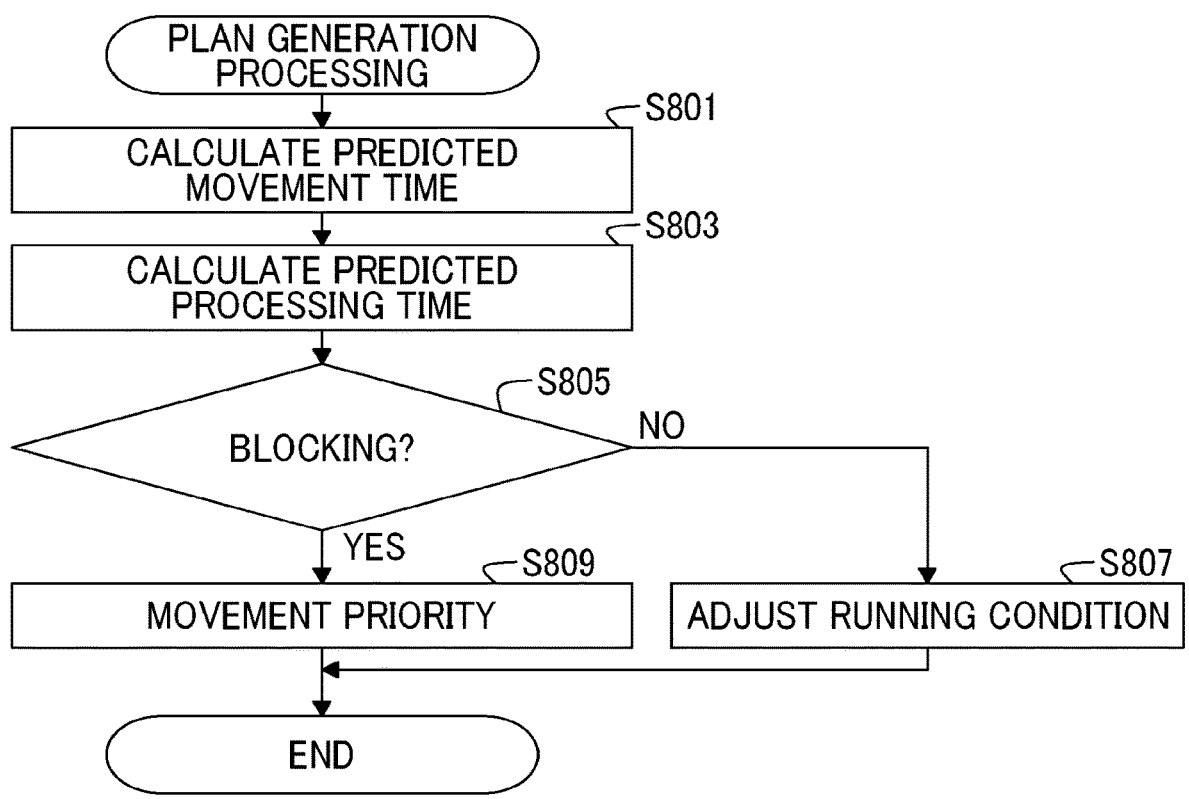
FIG. 8 is a flowchart of plan generation processing of the flowchart in FIG. 7.

Here, the generation of the running plan in step S703 of FIG. 7 will be further described based on FIG. 8. When a running plan is created, in principle, balance adjustment is performed between a predicted time to move to a shipping destination of the autonomous traveling vehicle (hereinafter referred to as predicted movement time) and a requested time from the start to the end of the predetermined processing in the processing apparatus 111 of the autonomous traveling vehicle (hereinafter referred to as predicted processing time). In the embodiment, the running plan is generated such that the predetermined item is in a shipping state, specifically, the wrapping in the wrapping apparatus is completed when the autonomous traveling vehicle arrives at the shipping destination of the predetermined item. First, the autonomous traveling vehicle 100A, that is, the plan generation unit 1045 of the controller 104 calculates a predicted movement time of the autonomous traveling vehicle 100A based on the second information according to a predetermined program (step S801). The calculation of the predicted movement time may be executed by a corresponding function unit of a generally known navigation system.

The autonomous traveling vehicle 100A, that is, the plan generation unit 1045 of the controller 104 operates the processing apparatus 111 based on the first information according to a predetermined program to calculate a predicted processing time requested to produce the number of ordered predetermined items based on the order information (step S803). The calculation of the predicted processing time may be executed based on specification data or the like of the processing apparatus 111. The calculation of the predicted movement time and the calculation of the predicted processing time may be performed in a reverse order or in parallel. The same applies to a second embodiment described below.

When the running command does not include the blocking information (NO in step S805), a running plan and an operation plan are generated while a running condition such as a route or speed adjustment of the autonomous traveling vehicle 100A is adjusted such that the predetermined item is in the shipping state and such that the predicted movement time is adjusted in order to adjust balance with the calculated predicted processing time, when the autonomous traveling vehicle arrives at the shipping destination of the predetermined item (step S807). For example, when a predicted movement time calculated according to a basic mode of a predetermined program is shorter than the calculated predicted processing time, when a route for calculating the predicted movement time includes an expressway, a part of the route may be changed to a route other than the expressway such that the predicted movement time is lengthened. The route change may take into account a speed limit for each road. For example, when the route R includes an expressway in the example of FIG. 1, a movement route is changed to the route R1 that does not include an expressway. As described above, when the running plan of the autonomous traveling vehicle is created, the plan generation unit 1045 adjusts the running condition of the autonomous traveling vehicle such as selection of the movement route such that the predicted movement time of the autonomous traveling vehicle based on the second information becomes a time equal to or larger than the predicted processing time from the start to the end of the predetermined processing in the processing apparatus 111 based on the first information. On the other hand, when the calculated predicted movement time is longer than the calculated predicted processing time, the processing start time in the processing apparatus 111 may be adjusted.

On the other hand, when the running command includes blocking information such as "request for delivery as soon as possible" or "strict adherence to delivery date and time" since the order information includes the blocking information (YES in step S805), the plan generation unit 1045 generates a running plan and an operation plan for continuing a part of the processing in the processing apparatus 111 even after the vehicle arrives at the shipping destination with a priority on the movement to the shipping destination, even when the calculated predicted movement time is shorter than the calculated predicted processing time (step S809). The blocking information such as "request for delivery as soon as possible" or "strict adherence to delivery date and time" is information that triggers the operation of blocking means for blocking the adjustment of the balance between the predicted movement time and the predicted processing time. All of the processing in the processing apparatus 111 may be performed after the vehicle arrives at the shipping destination. The plan generation unit 1045 may change the priority in the processing included in the first information or the processing of steps to generate an operation plan such that processing with a low priority is executed later.

In this manner, when the blocking information acquisition unit 1044 acquires the blocking information that prioritizes the running of the autonomous traveling vehicle 100A, that is, blocks the adjustment of the running condition of the autonomous traveling vehicle, the adjustment of the running condition of the autonomous traveling vehicle is not executed. In this case, the operation controller 1048 of the controller 104 executes partial control of the operation of the processing apparatus 111 based on the first information when the autonomous traveling vehicle is in a non-running state. The time when the autonomous traveling vehicle is in the non-running state may include a time when the autonomous traveling vehicle does not travel, for example, a time when the autonomous traveling vehicle has already arrived at the shipping destination.

As described above, the controller 104 of the information processing apparatus 102 of the autonomous traveling vehicle 100A executes the predetermined processing in the processing apparatus 111 mounted on the autonomous traveling vehicle while the vehicle travels in the embodiment. Therefore, it is possible to shorten the time for the shipping of the item and thus improve the efficiency thereof in the embodiment as compared with a case, as commonly performed, where a shipping item is completed at a factory or the like, then is loaded on a vehicle, and is shipped.

Next, the second embodiment of the disclosure will be described. In the following, differences between a shipping system according to the second embodiment and the shipping system S according to the first embodiment will be mainly described. The same reference numerals are assigned to components corresponding to the components already described, and redundant description is omitted.

Figure 9:
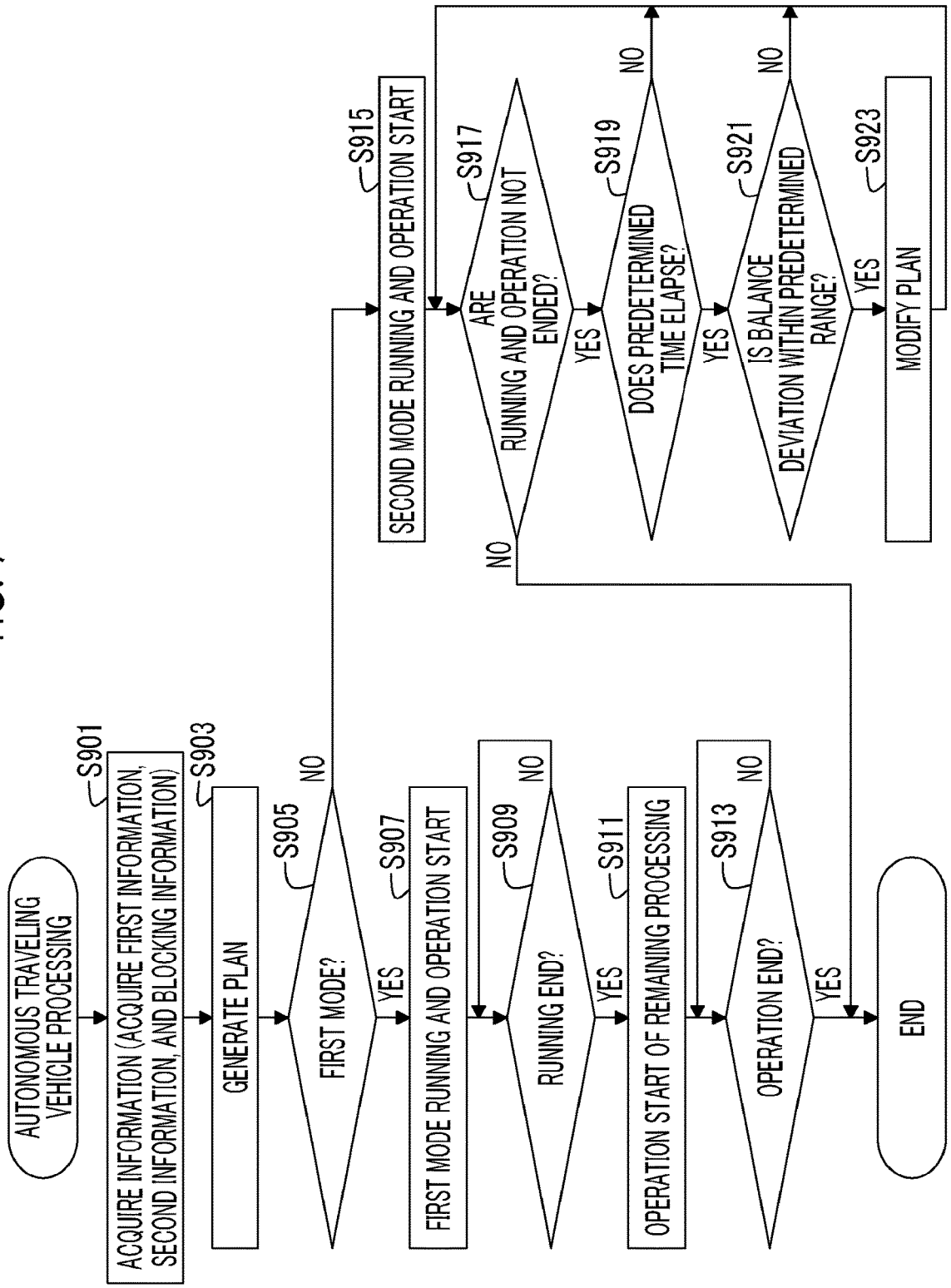
FIG. 9 is a flowchart of processing of the autonomous traveling vehicle in a system according to a second embodiment of the disclosure.

The second embodiment is different from the first embodiment in terms of the running of the autonomous traveling vehicle 100A and the operation of the processing apparatus 111 mounted thereon, for example, in a program that executes the running and the operation. The running of the autonomous traveling vehicle 100A and the operation of the processing apparatus 111 mounted thereon will be described with reference to a flowchart of FIG. 9. The shipping system according to the second embodiment is substantially the same as the shipping system S according to the first embodiment in that the autonomous traveling vehicles 100 and the server apparatus 200 are included, the autonomous traveling vehicles 100 can be run or operated based on information from the server apparatus 200, and the autonomous traveling vehicle 100A, the server apparatus 200, and the user apparatus 300 respectively have the above configurations.

When the order information from the user apparatus 300A is transmitted to the server apparatus 200 and the running command is transmitted from the server apparatus 200 to the autonomous traveling vehicle 100A, the autonomous traveling vehicle 100A, that is, the information acquisition unit 1041 of the controller 104 acquires information as a running command from the server apparatus 200 (step S901). The acquisition of this information is the same as that described in step S701 in FIG. 7 of the first embodiment.

The autonomous traveling vehicle 100A, that is, the plan generation unit 1045 of the controller 104 generates a running plan and an operation plan as described above (step S903). Accordingly, when the running command does not include the blocking information (NO in step S805), a running plan and an operation plan are generated while a running condition such as a route or speed adjustment of the autonomous traveling vehicle 100A is adjusted such that the predetermined item is in the shipping state and such that the predicted movement time is adjusted in order to adjust balance with the calculated predicted processing time, when the autonomous traveling vehicle arrives at the shipping destination of the predetermined item (step S807). On the other hand, when the running command includes blocking information since the order information includes the blocking information (YES in step S805), the plan generation unit 1045 generates a running plan and an operation plan for continuing a part of the processing in the processing apparatus 111 even after the vehicle arrives at the shipping destination with a priority on the movement to the shipping destination (step S809). This is the same as already described in relation to step S703 in FIG. 7 of the first embodiment.

Here, a mode for generating the running plan and the operation plan when the running command includes the blocking information is referred to as a first mode, and a mode for generating the running plan and the operation plan when the running command does not include the blocking information is referred to as a second mode. When the first mode is set since the running command includes the blocking information (YES in step S905 of FIG. 9), the control of the running of the autonomous traveling vehicle 100A and the control of the operation of the processing apparatus 111 are started according to the running plan and the operation plan generated in the first mode (step S907). The controls are started by transmission of the running plan from the plan generation unit 1045 to the task controller 1047 and transmission of the operation plan from the plan generation unit 1045 to the operation controller 1048. Here, the movement is prioritized. Therefore, it is assumed that the running plan and the operation plan are generated such that a part of the processing in the processing apparatus 111 is performed while the autonomous traveling vehicle 100A travels, and remaining processing thereof is executed after the autonomous traveling vehicle 100A arrives at the destination.

When the autonomous traveling vehicle 100A, in which a part of the processing in the processing apparatus 111 is executed, arrives at the destination (YES in step S909), the remaining processing of the processing in processing apparatus 111 is started (step S911). When the operation of the processing apparatus 111 for the remaining processing ends (YES in step S913), a series of shipping processing is completed. The plan generation unit 1045 of the controller 104 can monitor these pieces of processing.

On the other hand, when the second mode is set since the running command does not include the blocking information (NO in step S905 of FIG. 9), the control of the running of the autonomous traveling vehicle 100A and the control of the operation of the processing apparatus 111 are started according to the running plan and the operation plan generated in the second mode (step S915). Here, the running control of the autonomous traveling vehicle 100A and the operation control of the processing apparatus 111 are executed while the balance adjustment between the predicted movement time and the predicted processing time is performed. The controls are started by transmission of the running plan from the plan generation unit 1045 to the task controller 1047 and transmission of the operation plan from the plan generation unit 1045 to the operation controller 1048.

When the running control of the autonomous traveling vehicle 100A and the operation control of the processing apparatus 111 are started (step S915) and both the running of the autonomous traveling vehicle 100A and the operation of the processing apparatus 111 do not end (YES in step S917), determination is made whether or not a predetermined time elapses (step S919). The predetermined time may be set in advance as a time during which a balance deviation between the predicted movement time and the predicted processing time may occur, but may be variable. When the predetermined time elapses (YES in step S919), determination is made whether or not the balance deviation between the predicted movement time and the predicted processing time is within a predetermined range (step S921). Here, a predicted movement time to the destination at the timepoint is calculated, and a predicted processing time of the remaining processing in the processing apparatus 111 at the timepoint is calculated. Then, determination is made whether the balance deviation between the calculated predicted movement time and predicted processing time, for example, magnitude of a difference therebetween is within a predetermined range. As a result of the determination, when the balance deviation is within the predetermined range (NO in step S921), the running control of the autonomous traveling vehicle 100A and the operation control of the processing apparatus 111 according to the set running plan and operation plan continue.

When the balance deviation is out of the predetermined range (Yes in step S921), the plan is modified, particularly the running plan is modified (step S923). The modification of the running plan is executed according to a predetermined program such that the deviation is suppressed. Here, in particular, the running plan is modified in order to adjust the running condition such that the predicted movement time becomes a time equal to or larger than the predicted processing time. A running plan newly generated by the plan generation unit 1045 is transmitted to the task controller 1047. For example, when the predicted movement time is longer than the predicted processing time, a route with a shorter route is selected or a route with a fast speed limit is selected, that is, a movement route is changed. When the predicted processing time is longer than the predicted movement time, a route with a longer route is selected or a route with a slower speed limit is selected. When the predicted processing time is longer than the predicted movement time by a predetermined second time or more, the operation plan may be modified such that the processing in the processing apparatus 111 is executed after the autonomous traveling vehicle 100A is stopped at a resting place or the like or the autonomous traveling vehicle 100A arrives at the destination. When the operation plan is modified, the plan generation unit 1045 transmits a newly generated operation plan to the operation controller 1048.

Steps S919 to S923 may be repeated until both the running of the autonomous traveling vehicle 100A and the operation of the processing apparatus 111 end (NO in step S917). Steps S915 to S923 are executed by the plan generation unit 1045 in cooperation with the task controller 1047 or the operation controller 1048.

As described above, in the second embodiment, a part or all of the processing in the processing apparatus 111 is performed after the autonomous traveling vehicle 100A arrives at the destination when the movement is prioritized. When the movement is not particularly prioritized, the running control of the autonomous traveling vehicle and the operation control of the processing apparatus, particularly the running control of the autonomous traveling vehicle is executed while the balance adjustment between the predicted movement time of the autonomous traveling vehicle and the predicted processing time of the processing apparatus is performed. Accordingly, it is possible to suitably deliver the predetermined item to the shipping destination while the processing apparatus 111 executes the processing relating to the predetermined item inside the autonomous traveling vehicle during the traveling of the autonomous traveling vehicle. Therefore, it is possible to further improve the efficiency of shipping.

The above embodiments are merely examples, and the disclosure may be implemented with appropriate changes within a range not departing from the gist thereof. The processing and means described in the disclosure can be freely combined and implemented as long as no technical contradiction occurs. For example, the server apparatus 200 may execute plan generation (S701 and S703 in FIGS. 7 and S901 and S902 in FIG. 9) and deliver the generated plan to the autonomous traveling vehicle 100A.

Further, the processing described as being performed by one apparatus may be executed by a plurality of apparatuses in a shared manner. For example, the server apparatus 200 which is the information processing apparatus and the information processing apparatus 102 of the autonomous traveling vehicle 100A do not need to be one computer and may be configured as a system including a plurality of computers. Alternatively, the processing described as being performed by different apparatuses may be executed by one apparatus. In the computer system, it is possible to flexibly change the hardware configuration (server configuration) for realizing each function.

The disclosure can also be realized by supplying a computer program having the functions described in the above embodiments to a computer and reading and executing the program by one or more processors included in the computer. Such a computer program may be provided to the computer by a non-transitory computer-readable storage medium connectable to a computer system bus, or may be provided to the computer through a network. Examples of the non-transitory computer-readable storage medium include any type of disk such as a magnetic disk (floppy (registered trademark) disk, hard disk drive (HDD), or the like) or an optical disk (CD-ROM, DVD disk, Blu-ray disk, or the like), a read-only memory (ROM), a random access memory (RAM), an EPROM, an EEPROM, a magnetic card, a flash memory, an optical card, and any type of medium suitable for storing an electronic instruction.

What is claimed is:

1. An information processing apparatus comprising a controller configured to execute:
   acquiring first information relating to a predetermined item, the first information relating to predetermined processing in a processing apparatus mounted on a mobile body,
   acquiring second information relating to shipping of the predetermined item,
   controlling running of the mobile body based on the second information, and
   controlling an operation of the processing apparatus based on the first information when the mobile body is in a running state based on the second information,
   wherein the controlling of the running of the mobile body includes adjusting a running condition of the mobile body such that a predicted movement time of the mobile body based on the second information becomes a time equal to or larger than a predicted processing time from a start to an end of the predetermined processing in the processing apparatus based on the first information.

2. The information processing apparatus according to claim 1, wherein the adjustment of the running condition of the mobile body includes selection of a movement route.

3. The information processing apparatus according to claim 1, wherein the controller further executes causing non-execution of the adjustment of the running condition of the mobile body when blocking information for blocking the adjustment of the running condition of the mobile body is acquired.

4. The information processing apparatus according to claim 3, wherein the controller further executes controlling a part of the operation of the processing apparatus based on the first information when the mobile body is in a non-running state in a case where non-execution of the adjustment of the running condition of the mobile body is caused.

5. An information processing method executed by at least one computer, the information processing method comprising:
- acquiring first information relating to a predetermined item, the first information relating to predetermined processing in a processing apparatus mounted on a mobile body;
- acquiring second information relating to shipping of the predetermined item;
- controlling running of the mobile body based on the second information; and
- controlling an operation of the processing apparatus based on the first information when the mobile body is in a running state based on the second information,
- wherein the controlling of the running of the mobile body includes adjusting a running condition of the mobile body such that a predicted movement time of the mobile body based on the second information becomes a time equal to or larger than a predicted processing time from a start to an end of the predetermined processing in the processing apparatus based on the first information.

6. The information processing method according to claim 5, wherein the adjustment of the running condition of the mobile body includes selection of a movement route.

7. The information processing method according to claim 5, wherein the at least one computer further executes causing non-execution of the adjustment of the running condition of the mobile body when blocking information for blocking the adjustment of the running condition of the mobile body is acquired.

8. The information processing method according to claim 7, wherein the at least one computer further executes controlling a part of the operation of the processing apparatus based on the first information when the mobile body is in a non-running state in a case where non-execution of the adjustment of the running condition of the mobile body is caused.

9. A non-transitory computer-readable storage medium storing instructions which, when executed by at least one processor, cause the at least one processor to perform operations comprising:
- acquiring first information relating to a predetermined item, the first information relating to predetermined processing in a processing apparatus mounted on a mobile body,
- acquiring second information relating to shipping of the predetermined item,
- controlling running of the mobile body based on the second information, and
- controlling the operation of the processing apparatus based on the first information when the mobile body is in a running state based on the second information,
- wherein the controlling of the running of the mobile body includes adjusting a running condition of the mobile body such that a predicted movement time of the mobile body based on the second information becomes a time equal to or larger than a predicted processing time from a start to an end of the predetermined processing in the processing apparatus based on the first information.

\* \* \* \* \*